(12) United States Patent
Maguire et al.

(10) Patent No.: US 11,230,945 B2
(45) Date of Patent: Jan. 25, 2022

(54) GAS TURBINE ENGINE WITH INTERMEDIATE CASE BEARING ARRANGEMENT

(71) Applicant: ROLLS-ROYCE plc, London (GB)

(72) Inventors: Alan R. Maguire, Derby (GB); Stewart T. Thornton, Derby (GB); Philip C. Bond, London (GB); Glenn A. Knight, Derby (GB)

(73) Assignee: Rolls-Royce PLC, London (GB)

(*) Notice: Subject to any disclaimer, the term of this patent is extended or adjusted under 35 U.S.C. 154(b) by 108 days.

(21) Appl. No.: 16/720,068

(22) Filed: Dec. 19, 2019

(65) Prior Publication Data

US 2020/0224554 A1 Jul. 16, 2020

(30) Foreign Application Priority Data

Jan. 11, 2019 (GB) ..................................... 1900382

(51) Int. Cl.
*F01D 25/16* (2006.01)
*F02C 7/06* (2006.01)

(52) U.S. Cl.
CPC .............. *F01D 25/162* (2013.01); *F02C 7/06* (2013.01); *F05D 2240/54* (2013.01)

(58) Field of Classification Search
CPC ...... F01D 25/16; F01D 25/162; F01D 25/164; F05D 2240/54
See application file for complete search history.

(56) References Cited

U.S. PATENT DOCUMENTS

| 3,727,998 | A | 4/1973 | Haworth et al. |
| 6,428,269 | B1* | 8/2002 | Boratgis ............... F01D 21/045 411/2 |
| 8,402,741 | B1 | 3/2013 | Merry et al. |
| 10,100,736 | B2* | 10/2018 | Niergarth ................. F02C 7/14 |
| 2003/0210979 | A1 | 11/2003 | Doerflein et al. |
| 2008/0148707 | A1 | 6/2008 | Schilling |
| 2009/0285674 | A1 | 11/2009 | Mollmann et al. |

(Continued)

FOREIGN PATENT DOCUMENTS

| EP | 1126137 | 8/2001 |
| EP | 1227255 | 7/2002 |

(Continued)

OTHER PUBLICATIONS

European search report dated Jul. 2, 2020, issued in EP Patent Application No. 19216659.

(Continued)

*Primary Examiner* — Topaz L. Elliott
(74) *Attorney, Agent, or Firm* — Shumaker & Sieffert, P.A.

(57) ABSTRACT

A gas turbine engine for an aircraft. The gas turbine engine comprises a rotatable shaft defining a rotational axis extending between rearward and forward ends of the gas turbine engine and a compressor drum surrounding, and coupled to, the shaft so as to define an annular gap therebetween. The gas turbine engine further comprises an intermediate case arranged axially rearward of the compressor drum and comprising a bearing support element extending into the annular gap, and a forward bearing mounted between the bearing support element and the shaft proximate a forward end of the compressor drum.

14 Claims, 3 Drawing Sheets

(56) References Cited

U.S. PATENT DOCUMENTS

| | | | |
|---|---|---|---|
| 2011/0056213 A1 | 3/2011 | Somanath et al. | |
| 2012/0039710 A1 | 2/2012 | Mathieu et al. | |
| 2013/0192199 A1 | 8/2013 | Merry et al. | |
| 2017/0082065 A1* | 3/2017 | Swift | F02K 3/06 |
| 2017/0122206 A1* | 5/2017 | Niergarth | F02C 7/14 |
| 2020/0072081 A1* | 3/2020 | Gallet | F16C 25/083 |
| 2020/0200789 A1* | 6/2020 | Shepherd | F01D 17/06 |
| 2020/0263547 A1* | 8/2020 | Stuart | F01D 5/06 |

FOREIGN PATENT DOCUMENTS

| | | | |
|---|---|---|---|
| EP | 3165719 | 5/2017 | |
| EP | 3438420 | 2/2019 | |
| FR | 2752024 | 2/1998 | |
| GB | 718827 | 11/1954 | |
| GB | 2535866 A * | 8/2016 | F01D 5/34 |

OTHER PUBLICATIONS

Great Britain search report dated Jun. 24, 2019, issued in GB Patent Application No. 1900382.1.

\* cited by examiner

GAS TURBINE ENGINE WITH INTERMEDIATE CASE BEARING ARRANGEMENT

CROSS-REFERENCE TO RELATED APPLICATIONS

This application is based upon and claims the benefit of priority from United Kingdom patent application number GB1900382.1 filed on 11th of Jan. 2019, the entire contents of which are incorporated herein by reference.

BACKGROUND

Technical Field

The present disclosure relates to a gas turbine engine.

Description of the Related Art

A typical gas turbine engine comprises two or three compressors that are connected to, and driven by, turbines by corresponding shafts. For example, one such engine may comprise a high-pressure (HP) compressor and an intermediate-pressure (IP) compressor connected to corresponding high-pressure (HP) and intermediate-pressure (IP) turbines. The compressors, turbines and shafts may be aligned along a general rotational axis of the turbine engine.

In some cases, an intermediate case (or intercase) may be located between two compressors (such as the IP and HP compressors). The intermediate case is a static structure (as opposed to the rotating shafts, compressors and turbines) that transfers loading from the shafts to an engine casing.

The turbine engine may comprise further components, such as a fan assembly that may include a gearbox for driving the fan. The fan assembly is generally in a forward position relative to the IP compressor, such that the IP compressor is interposed between the fan assembly and the intermediate case.

To support axial and radial loading, bearings are provided between the shafts and other components of the turbine engine, such as between the IP shaft (connecting the IP compressor and the IP turbine) and the fan assembly and/or the intermediate case. For example, slope control (i.e. off-axis displacement) of the IP shaft is sometimes provided by a bearing mounted between the shaft and a component (e.g. an inlet case) that is located adjacent to, and axially forward of the IP compressor. However, relative movement (e.g. caused by bending) between the forward component (e.g. inlet case) and rearward components providing rearward (axial and/or radial) support to the shaft can result in displacement between forward and rearward bearings, and thus off-axis displacement of the shaft. Such movement is generally undesirable, and there is therefore a need to prevent or at least reduce this movement.

SUMMARY

In a first aspect there is provided a gas turbine engine for an aircraft, the gas turbine engine comprising: a rotatable shaft defining a rotational axis extending between a rearward end and a forward end of the gas turbine engine; a compressor drum surrounding, and coupled to, the shaft so as to define an annular gap therebetween, an intermediate case arranged axially rearward of the compressor drum and comprising a bearing support element extending into the annular gap; a rearward bearing mounted between the intermediate case and the shaft; and a forward bearing that is forward of the rearward bearing, mounted between the bearing support element and the shaft, and proximate a forward end of the compressor drum.

Providing rearward and forward bearing that are both mounted between the shaft and the intermediate case can help to control slope (i.e. off-axis displacement) of the shaft. Because the intermediate case is a static (i.e. non-rotating) structure, it may provide a stable support structure against which axial and/or radial loading may be resisted. In particular, the issue of relative movement between the forward bearing and rearward bearing may be at least partially alleviated, because both the forward and rearward bearings are mounted to the same static structure. Thus, the present arrangement may lead to improved slope control of the shaft.

The terms forward and rearward are used with respect to an in-use orientation of the gas turbine engine (e.g. when used with an aircraft moving in a forward direction). That is, the forward end is an in-use upstream end of the turbine and the rearward end is downstream of the forward end. Thus, for example, a first feature that is forward of a second feature is closer to the forward end than the second feature.

Optional features of the present disclosure will now be set out. These are applicable singly or in any combination with any aspect of the present disclosure.

The forward bearing is proximate to a forward end of the compressor drum. The forward bearing may be rearward of the forward end of the compressor drum. The forward bearing may be aligned with the forward end of the compressor drum. The forward bearing may be forward of the forward end of the compressor drum. The forward bearing may be located proximate a forward (i.e. distal) end of the bearing support element.

The forward bearing may be less than 2 mm from the forward end of the compressor drum (i.e. the axial spacing of the forward bearing from the forward end of the compressor drum may be less than 2 mm). The forward bearing may be less than 1 mm from the forward end of the compressor drum (i.e. the axial spacing may be less than 1 mm).

The forward bearing may be less than 50% of an axial length of the compressor drum from the forward end of the compressor drum. The forward bearing may be less than 25% of an axial length of the compressor drum from the forward end of the compressor drum. The forward bearing may be less than 10% of an axial length of the compressor drum from the forward end of the compressor drum.

The rearward bearing may be proximate the rearward end of the compressor drum. The rearward bearing may be substantially aligned with the rearward end of the compressor drum. The rearward bearing may be forward of the rearward end of the compressor drum. The rearward bearing may be rearward of the rearward end of the compressor drum. The rearward bearing may be, at least partially, located in the gap between the shaft and the compressor drum.

The rearward bearing may be less than 2 mm from the rearward end of the compressor drum (i.e. the axial spacing of the reward bearing from the rearward end of the compressor drum may be less than 2 mm). The rearward bearing may be less than 1 mm from the rearward end of the compressor drum (i.e. the axial spacing may be less than 1 mm).

The rearward bearing may be less than 50% of an axial length of the compressor drum from the rearward end of the compressor drum. The rearward bearing may be less than 25% of an axial length of the compressor drum from the rearward end of the compressor drum. The rearward bearing may be less than 10% of an axial length of the compressor drum from the rearward end of the compressor drum.

The rearward and forward bearings may be axially spaced by a distance that is between 20% and 200% of the axial length of the compressor drum. The rearward and forward bearings may be axially spaced by a distance that is between 50% and 150% of the axial length of the compressor drum. The rearward and forward bearings may be axially spaced by a distance that is between 75% and 125% of the axial length of the compressor drum.

The forward bearing may be configured to restrict movement between the shaft and the bearing support element in an axial and/or radial direction whilst permitting movement in a rotational (i.e. circumferential) direction. That is, the forward bearing may be configured to support the compressor drum and/or shaft with respect to the intermediate case. The forward bearing may be configured to restrict relative movement between the shaft and the bearing support element in a radial direction. The forward bearing may be a roller bearing. The forward bearing may be a ball bearing. Where the forward bearing is a roller bearing, the rollers of the roller bearing may rotate about respective axes that are parallel to the rotational axis (of the shaft). In some embodiments, one of the rearward bearing and the forward bearing is a roller bearing and the other of the rearward bearing and the forward bearing is a ball bearing.

The rearward bearing may be configured to restrict relative movement between the shaft and the intermediate case in an axial direction (i.e. whilst permitting rotation between the shaft and the intermediate case). The rearward bearing may be further configured to restrict relative movement between the shaft and the intermediate case in the radial direction. The rearward bearing may be in the form of a ball bearing. The rearward bearing may be of a different type to the forward bearing (e.g. the forward bearing may be a roller bearing and the rearward bearing may be a ball bearing). The rearward bearing may be wider (i.e. in the axial direction) than the forward bearing.

The compressor drum may be an intermediate-pressure (IP) compressor drum of the gas turbine engine. Where the gas turbine engine comprises only an IP compressor and a high-pressure compressor, the IP compressor may be considered a low-pressure (LP) compressor (i.e. in some cases either of the terms IP compressor or LP compressor may be used to describe the lower pressure compressor). The shaft may be an IP shaft of the gas turbine engine and the forward bearing may be a forward (or front) intermediate-pressure compressor (IPC) bearing of the gas turbine engine.

The forward bearing may be rearward of the coupling of the compressor drum and the shaft. The shaft may comprise a drive arm that couples the compressor to the shaft (i.e. the drive arm may couple the compressor to a main body of the shaft). The drive arm may extend at least partway across the gap. The compressor drum may comprise a connector portion coupling the compressor drum to the shaft. The connector portion may extend at least partway across the gap (e.g. so as to meet the drive arm partway across the gap). The drive arm may extend in a generally forward direction (but on an angle with respect to the rotational axis) from the main body of the shaft. The drive arm may be coupled to the connector portion. For example, the drive arm and connector portion may be coupled by way of a spline connection. Alternatively, the drive arm and connector portion may be coupled by way of e.g. a curvic connection (or another connection type suitable for transmitting torque between components).

The drive arm may be in the form of a skirt. At least a portion of the skirt may be frustoconical. Thus, the skirt may extend partway or fully about the rotational axis (i.e. so as to surround a main body of the shaft). The skirt may extend in a generally axial direction (i.e. from a rearward end to a forward end). The rearward end of the skirt may have a smaller diameter than the forward end of the skirt. The forward end of the skirt may be coupled to the compressor drum (i.e. by spline, curvic, etc. connection). In this respect, the forward end of the skirt may comprise an axially-extending (i.e. non-frustoconical) section. The connector portion may comprise a corresponding axially-extending (i.e. non-angled/inclined) section configured for connection with the axially-extending section of the skirt. This may facilitate connection between the drive arm and the compressor drum.

The rearward end of the skirt may comprise an axially-extending (i.e. non-frustoconical or non-angled) section. Thus, an outer surface of this axially-extending section may provide an outer circumferential surface that is generally parallel to the rotational axis. The forward bearing may be mounted between the bearing support element and the drive arm. The forward bearing may be mounted at a portion of the drive arm that is spaced from the torque path of the drive arm. That is, the bearing may be mounted at a non-torque transferring portion of the drive arm. For example, where the drive arm comprises a rearward axially-extending section, the forward bearing may be mounted at the outer circumferential surface of the rearward axially-extending section. That is, the forward bearing may be mounted between the bearing support element and the outer circumferential surface of the axially-extending section. The drive arm may be coupled to a body of the shaft between the rearward axially-extending portion and its connection to the compressor drum. Thus, the rearward axially-extending portion may not form part of the torque path between the shaft and the compressor drum. In some embodiments, the forward bearing is mounted between a rearward end of the drive arm and the bearing support element.

Alternatively, the drive arm may comprise an outer sleeve. The forward bearing may be mounted between the outer sleeve of the drive arm and the bearing support element. The outer sleeve of the forward bearing may be spaced from the torque path extending between the shaft and the compressor drum.

The compressor drum may comprise a plurality of coupled compressor discs arranged (i.e. stacked) axially along the rotational axis. The compressor drum may comprise four discs (i.e. defining four stages of the compressor drum). Alternatively, the compressor drum may comprise less (e.g. 2 or 3) or more (e.g. 5, 6, 7, etc.) than four compressor discs. Each compressor disc may comprise a plurality of radially outwardly projecting blades. Each compressor disc may have a generally annular shape (i.e. an annular cross-section taken transverse to the rotational axis). Each compressor disc may comprise a circumferentially extending rim. Each compressor disc may comprise a cob (e.g. flange) extending about an inner circumference of the compressor disc. The rim and the cob of each compressor disc may be radially spaced by a web. The blades may be mounted to (or integral with) the rims of the compressor discs. The rim and/or cob of each compressor disc may be thicker than the web of the compressor disc.

The forward bearing may be located axially between the forward end of the compressor drum and the second most forward disc (i.e. second compressor stage) of the compressor drum. The forward bearing may be located axially between the forwardmost disc (i.e. first compressor stage) of the compressor drum and the second most forward disc of the compressor drum. The rearward bearing may be located axially between the rearmost compressor disc (i.e. last compressor stage) and the shaft. The rearward bearing may be mounted between the bearing support element and the shaft.

The compressor drum may be coupled to the shaft via the cob of one of the compressor discs. Thus, the connector portion (i.e. connecting the compressor drum to the shaft) may extend from the cob of one of the compressor discs. The connector portion may be integral with the cob. The compressor drum may be coupled to the shaft via the cob of the forwardmost compressor disc of the compressor discs. That is, the connector portion may extend from the cob of the forwardmost compressor disc (i.e. so as to couple the compressor drum to the shaft (e.g. via the drive arm)).

The bearing support element may be in the form of a skirt projecting from a body of the intermediate case. The skirt may have a frustoconical shape. A forward end of the skirt (i.e. located in the gap between the shaft and the compressor drum) may have a smaller diameter than a rearward end of the skirt (i.e. mounted to (or integral with) the body of the intermediate case). The bearing support element may have forward and rearward sections. The forward and rearward sections may be integral, or may be coupled to one another. The forward and rearward section may be coupled by way of a bolt and dowel arrangement. Each of the forward and rearward sections may be in the form of a frustoconical skirt. The incline (i.e. with respect to the rotational axis) of the rearward section may be greater than the forward section. The bearing support element may comprise radially extending ribs (i.e. which may strengthen the bearing support). Each rib may taper so as to be wider (i.e. in the radial direction) at a rearward end compared to a forward end thereof.

The bearing support element and/or the shaft (e.g. drive arm of the shaft) may comprise a forward bearing mount for mounting the forward bearing thereto. One of the bearing support element or the shaft (e.g. drive arm) may comprise a bearing surface for interaction (i.e. rolling contact) with the forward bearing. The bearing surface may be substantially parallel to the rotational axis (i.e. so as to be axially-extending).

The intermediate case (e.g. the bearing support element) and/or the shaft may comprise a bearing mount for mounting the rearward bearing thereto. The bearing mount may depend from the rearward portion of the bearing support element (i.e. where the bearing support element comprises forward and rearward bearing portions).

A sealing ring may be mounted between the bearing support element and the shaft (e.g. the drive arm of the shaft). The sealing ring may located forward of the forward bearing (i.e. at an extreme distal end of the bearing support element). A sealing ring differs from a bearing in that it does not provide support (or provides very limited support) to the shaft/compressor. The sealing ring may be in the form of e.g. a circumferential carbon seal or a labyrinth seal.

The shaft may be a hollow shaft (i.e. having an elongate cavity). A rearward end of the shaft may be coupled to an IP turbine. The shaft may comprise (in addition to the drive arm) a rear stub shaft coupled to a front stub shaft (located forward of the rear stub shaft). The rear and front stub shafts may be coupled by way of a curvic connection. The rear stub shaft may be generally frustoconical (and may flare outwardly from the rotational axis in a forward direction). The front stub shaft may also be frustoconical and may extend inwardly towards the rotational axis in a forward direction (i.e. from its coupling with the rear stub shaft). The drive arm may be coupled to (and may extend forwardly from) a forward end of the front stub shaft.

The turbine engine may comprise a forward bearing oil supply arrangement. The oil supply arrangement may comprise a cascade oil feed. The cascade oil feed may comprise one or more apertures extending through the shaft (i.e. providing an oil feed path through the shaft). The apertures may extend through the shaft (e.g. through the front stub shaft) at an angle that is inclined to the rotational axis of the shaft. In some cases a further hollow inner shaft may be located within the cavity of the shaft (i.e. the cavity of the outer shaft) and apertures may be provided in the inner shaft to provide an oil feed path through the further shaft. One or both of the shafts may comprise projecting rings to guide oil into the apertures (i.e. so as to cause the oil to flow radially outwardly along an oil feed path from an internal cavity of the inner shaft to outside of the outer shaft). The apertures of the outer shaft may arranged so as to feed oil to the forward bearing. The oil supply arrangement may alternatively comprise a jet feed. The jet feed may, for example, supply oil from a gear box (e.g. a power gear box) of the turbine engine.

The turbine engine may comprise a fan assembly that is forward of the compressor drum. The inner shaft may be a thrust shaft of the fan assembly. An intershaft bearing may be provided between the fan thrust shaft and the IP shaft. The intershaft bearing may be configured to restrict axial and radial movement of the fan thrust shaft with respect to the IP shaft. Thus, the intershaft bearing may provide axial support to the fan. The intershaft bearing may be a ball bearing. The intershaft bearing may be located axially between the rearward bearing and the forward bearing.

The fan assembly may comprise a gearbox. The gearbox may be operatively connected to the shaft (i.e. the IP shaft). The gearbox may transmit torque from the IP shaft to a fan of the fan assembly. The gearbox may be connected to the IP shaft by an input shaft. The input shaft may be connected between the gearbox and the front stub shaft.

The gearbox may comprise a rear cover. A sealing ring may be disposed between the rear cover and the connector portion of the compressor drum. The sealing ring may be in the form of a circumferential carbon seal.

The fan assembly may comprise a fan (having fan blades) located upstream (or forward) of the compressor drum.

The gearbox may receive an input from the shaft and output drive to the fan so as to drive the fan at a lower rotational speed than the shaft. The input to the gearbox may be directly from the shaft, or indirectly from the shaft, for example via a spur shaft and/or gear. The shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Thus the shaft described above (e.g. the IP shaft) may be a first core shaft of the turbine engine. Thus, the turbine connected to the first core shaft may be considered a first turbine, the compressor (i.e. IP compressor) connected to the first core shaft may be considered a first compressor. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the figures, in which.

DETAILED DESCRIPTION

Aspects and embodiments of the present disclosure will now be discussed with reference to the accompanying figures. Further aspects and embodiments will be apparent to those skilled in the art.

Figure 1:
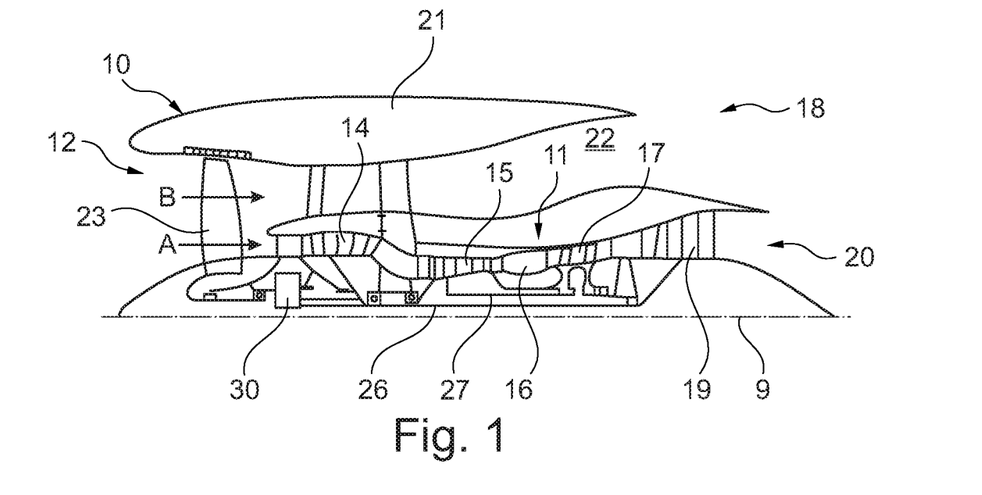
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, an intermediate-pressure compressor 14 (or low-pressure compressor), a high-pressure compressor 15, combustion equipment 16, a high-pressure turbine 17, an intermediate pressure turbine 19 (or low pressure turbine) and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the intermediate-pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and intermediate-pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
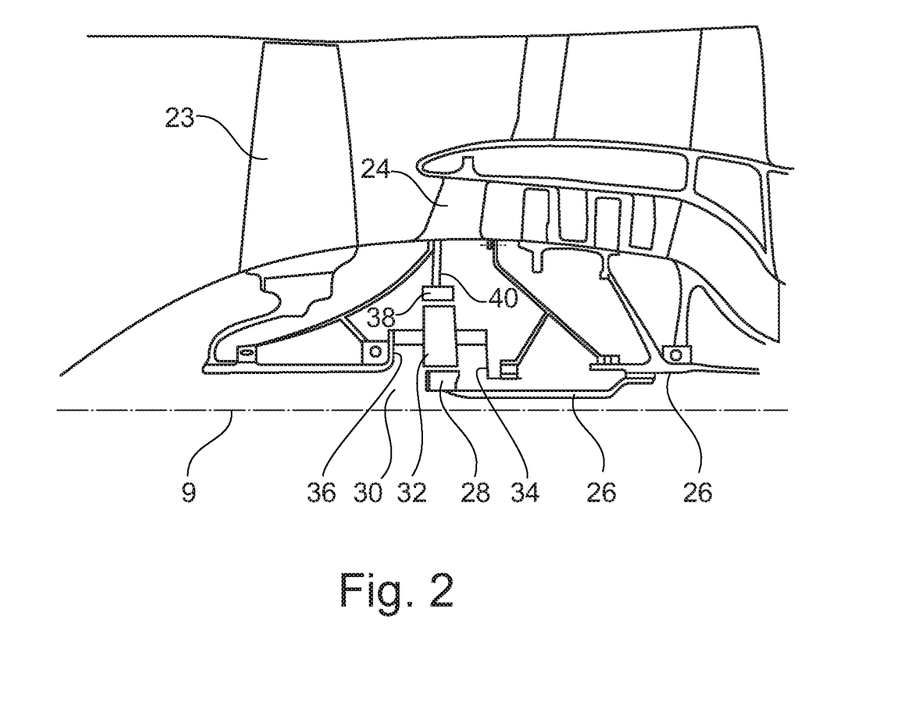
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "intermediate-pressure turbine" and "intermediate-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "intermediate-pressure turbine" and "intermediate-pressure compressor" referred to herein may alternatively be known as the "low pressure turbine" and "low pressure compressor". In some cases, where "intermediate" is used, the fan 23 may be referred to as a first, or lowest pressure, compression stage.

Figure 3:
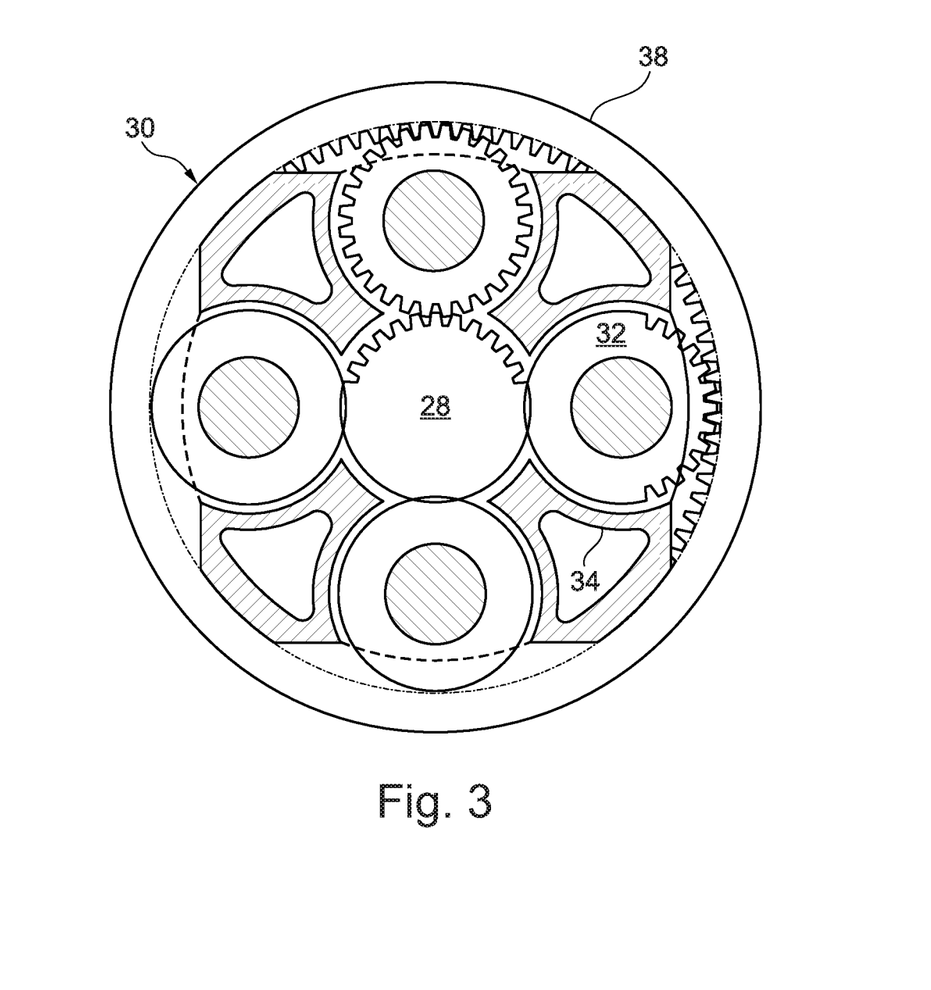
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
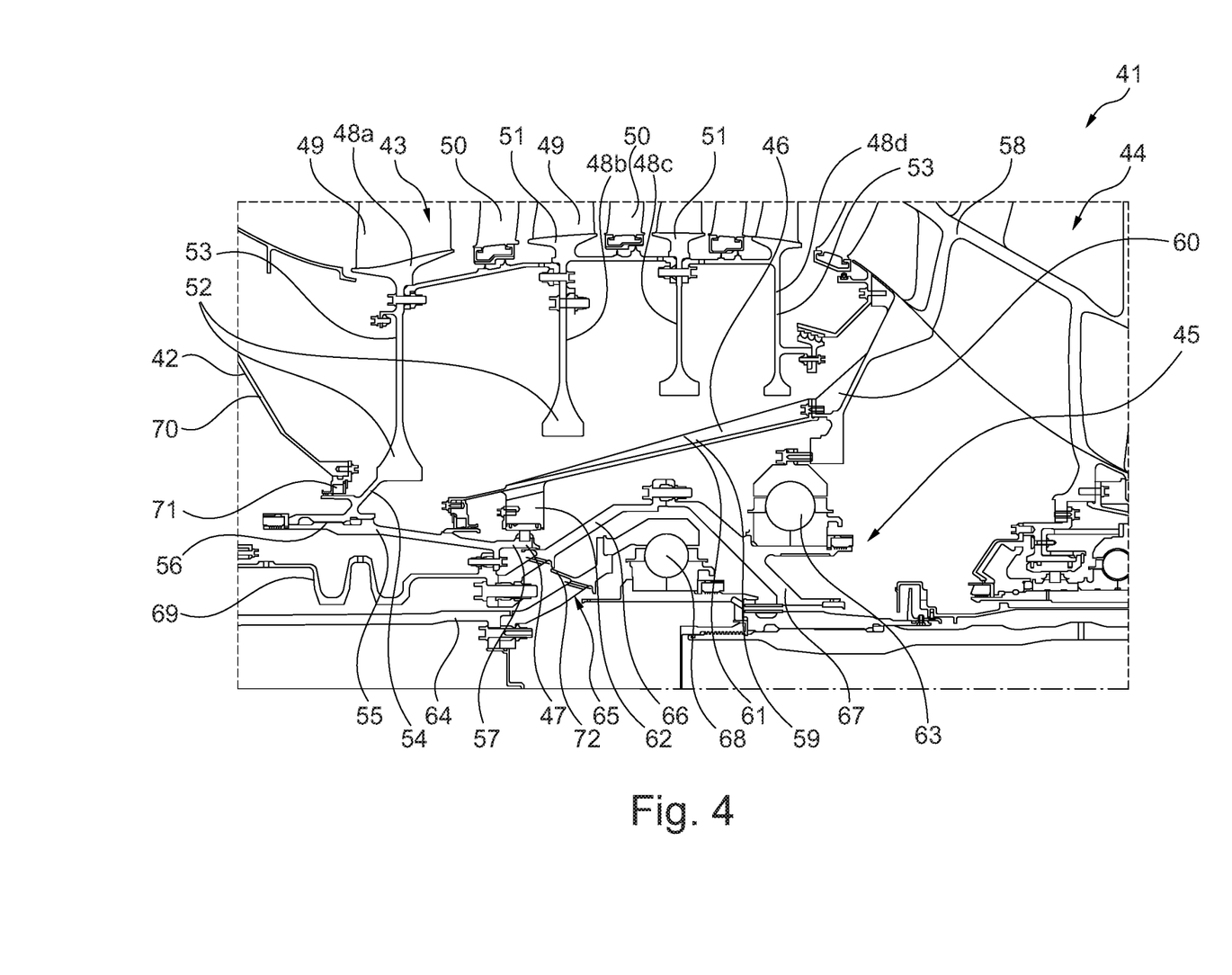
FIG. 4 is a detail section view of a portion of a gas turbine engine.

FIG. 4 illustrates a portion of a gas turbine engine 41. In particular, the portion of the gas turbine engine 41 illustrated includes (in a direction from the forward end to the rearward end of the gas turbine engine 41) part of a gear assembly 42, an intermediate-pressure (IP) compressor drum 43, and an intermediate case (or intercase) 44. A rotatable IP shaft 45, which connects the IP compressor drum 43 to an IP turbine (not shown), extends centrally in a direction between forward and rearward ends of the gas turbine engine 41 through the intermediate case 44 and the IP compressor drum 43.

As may be appreciated, the turbine engine 10 of FIGS. 1 to 3 could be configured as is shown in FIG. 4 and described below.

The IP compressor drum 43 surrounds, and is coupled to, the IP shaft 45 so as to define an annular gap therebetween. As will be described in further detail below, the intermediate case 44 comprises a bearing support element 46 that extends into the annular gap. An intermediate-pressure compressor (IPC) forward bearing 47 is mounted between the bearing support element 46 and the IP shaft 45 proximate a forward end of the IP compressor drum 43.

The IP compressor drum 43 comprises four axially arranged annular compressor discs 48a, 48b, 48c and 48d. Each compressor disc 48a, 48b, 48c, 48d comprises a plurality of radially outwardly projecting blades 49 that, in use, rotate between static vanes 50 to compress fluid (i.e. air) passing through the gas turbine engine 41. Each compressor disc 48a, 48b, 48c, 48d comprises a circumferentially extending rim 51 and a cob 52 (e.g. flange) extending about an inner circumference of the compressor disc 48a, 48b, 48c, 48d. The rim 51 and the cob 52 of each compressor disc 48a, 48b, 48c, 48d are radially spaced from one another by a web 53. The rims 51 and cobs 52 define thicker portions of each disc 48a, 48b, 48c, 48d (i.e. in the axial direction), whilst the webs 53 are a thinner portion of each disc 48a, 48b, 48c, 48d.

The discs 48a, 48b, 48c, 48d differ in the radial lengths of their webs 53, and thus the extent to which their respective cobs 52 are spaced from the IP shaft 45. The forwardmost disc 48a (i.e. the stage 1 disc) has the longest web 53, and thus the cob 52 of this disc is closer to the rotational axis of the IP shaft 45 (and the IP shaft 45 itself) than the cobs 52 of the stage 2, 3 and 4 discs 48b, 48c, 48d. In this respect the gap between the IP compressor drum 43 and the IP shaft 45 is generally smaller between the stage 1 disc 48a and the IP shaft 45 than the other discs 48b, 48c, 48d.

The IP compressor drum 43 is coupled to the IP shaft 45 via the cob 52 of the stage 1 compressor discs 48a. A connector portion 54 that is integrally formed with the cob 52 of the stage 1 disc 48a extends towards the IP shaft 45 in a forward direction (and angled with respect to the rotational axis of the IP shaft 45). In particular, the connector portion 54 connects to a drive arm 55 of the IP shaft 45 via a splined connection arrangement 56. To provide for this splined connection arrangement 56, the connector portion 54 comprises an axially-extending (i.e. parallel to the rotational axis) section having a circumferential spline surface that engages with a complementary axially-extending spline surface of the drive arm 55.

As is apparent from FIG. 4, the drive arm 55 extends in a generally forward direction, but is angled with respect to the rotational axis of the IP shaft 45 so as to extend partway across the gap towards the connector portion 54. In this respect, the drive arm 55 is in the form of a generally frustoconical skirt extending about the rotational axis of the IP shaft 45. The rearward end of the drive arm 55 has a smaller diameter than the forward end of the drive arm 55.

The rearward end of the drive arm 55 comprises an axially-extending (i.e. non-frustoconical or non-angled) section 57. The forward bearing 47, which is a roller bearing, is mounted between the bearing support element 46 and an outer surface of the rearward axially-extending section 57 and is oriented such that its rollers rotate about respective axes that are parallel to the rotational axis of the IP shaft 45. Hence, the rollers of the forward bearing 47 bear against, and roll along, the outer surface of the axially-extending section 57 (and thus this outer surface may be considered a bearing surface). In this way, the forward bearing 47 is configured to restrict movement between the IP shaft 45 and the bearing support element 46 in a radial direction whilst permitting relative rotational movement (i.e. in a circumferential direction).

The drive arm 55 is coupled (indirectly) to a front stub shaft 66 of the IP shaft 45, which is in turn coupled to a rear stub shaft 67 by way of a curvic connection. The axially-extending section 57 extends rearwardly of the location at which the drive arm 55 and front stub shaft 66 are coupled. This means that the torque path, which extends through the rear stub shaft 67, front stub shaft 66 and drive arm 55 to the connector portion 54, does not pass through the axially-extending section 57 (where the forward bearing 47 is mounted). As no (or limited) torque is transmitted through the axially-extending section 57, there may be less deflection of this section of the drive arm 55, which may facilitate support of the drive arm 55 by the forward bearing 47.

Like the drive arm 55, the bearing support element 46 is in the form of a frustoconical skirt. The bearing support element 46 projects from a body 58 of the intermediate case 44. A forward end of the bearing support element 46 (i.e. located in the gap between the IP shaft 45 and the IP compressor drum 43) has a smaller diameter than a rearward end of the bearing support element 46 (i.e. mounted to the body 58 of the intermediate case 44). That is, the bearing support element 46 extends generally inwardly at an angle to the rotational axis of the IP shaft 45.

The bearing support element 46 is formed of forward 59 and rearward 60 support element sections. The rearward support element section 60 is integral, at a rearward end, with the body 58 of the intermediate case 44. A rearward end of the forward support element section 59 is coupled to (by a bolt and nut arrangement), and projects from, a forward end of the rearward support element section 60. The incline (i.e. with respect to the rotational axis) of the rearward support element section 60 is greater than the forward support element section 59. The forward support element section 59 comprises circumferentially radially extending ribs 61 that are circumferentially spaced about the forward support element section 59. These ribs 61 are tapered so as to be wider (i.e. in the radial direction) at a rearward end of the forward support element section 59 compared to a forward end thereof.

The forward bearing 47 is mounted between the forward support element section 59 and the IP shaft 45 proximate a forward (i.e. distal) end of the forward support element section 59. In particularly, the forward bearing 47 is located axially between the forward end of the IP compressor drum 43 and the second most forward disc 48b of the IP compressor drum 43. A radially inwardly extending lip 62 of the forward support element section 59 defines an aperture in which the axially-extending section 57 of the drive arm 55 is received. The forward bearing 47 is mounted between the lip 62 and the axially-extending section 57.

The IP shaft 45 is further supported by a rearward bearing 63 axially spaced (in a rearward direction) from the forward bearing 47. Like the forward bearing 47, the rearward bearing 63 is mounted between the intermediate case 44 and the IP shaft 45. However, the rearward bearing 63 is in the form of a ball bearing, rather than a roller bearing, and is larger than the forward bearing 47. Thus, in addition to radial support, the rearward bearing 63 restricts movement of the IP shaft 45 relative to the intermediate case 44 in an axial direction (i.e. whilst permitting relative rotational movement).

The rearward bearing 63 is mounted between the rearward support element section 60 and the IP shaft 45, and is axially located proximate a rearward end of the IP compressor drum 43. In this way, the rearward bearing 63 is partially located in a gap defined between the rearmost compressor disc (i.e. the stage 4 disc) 48d and the IP shaft 45. In particular, a radially inward side of the rearward bearing 63 is mounted to a platform extending axially from an inclined portion of the IP shaft 45, and a radially outward side of the rearward bearing 63 is mounted to the rearward support element section 60.

The IP shaft 45 is a hollow shaft defining an elongate cavity. Although not shown, a rearward end of the shaft is coupled to an IP turbine that drives the IP compressor drum 43. A fan thrust shaft 64 is located within the cavity of the IP shaft 45 and is coaxial with the IP shaft 45 (i.e. such that the IP shaft 45 and fan thrust shaft 64 share a rotational axis). The fan thrust shaft 64 connects to a fan (not shown) of the gas turbine engine 41. An intershaft bearing 68 is provided between the fan thrust shaft 64 and the IP shaft 45. This intershaft bearing 68 is a ball bearing and restricts both axial and radial movement of the fan thrust shaft 64 relative to the IP shaft 45. Thus, the fan thrust shaft 64 transmits axial thrust from the fan to the intershaft bearing 68.

A further shaft, in the form of a gearbox input shaft 69 is coupled to the IP shaft 45 and, in this respect, may be considered as forming part of the IP shaft 45. The gearbox input shaft 69 transmits torque from the IP shaft 45 to a gearbox (not shown in FIG. 4) such as that shown in FIG. 3. This gearbox forms part of the gear assembly 42, which further includes a gearbox rear cover 70 that surrounds the splined connection arrangement 56 between the connector portion 54 and the drive arm 55. A circumferential carbon seal 71 is provided between the connector portion 54 and the gearbox rear cover 70.

To lubricate the forward bearing 47, the gas turbine engine 41 comprises a cascade oil feed arrangement 65 that is formed of a plurality of apertures extending through the fan thrust shaft 64 and the IP shaft 45 (i.e. providing an oil feed path through the IP shaft 45 and the fan thrust shaft 64). In particular, the apertures extend through the shaft at an angle that is inclined to the rotational axis of the IP shaft 45 and the fan thrust shaft 64. A guide ring 72 projects (at an angle to the rotational axis) from the fan thrust shaft 64 (aka inner shaft) so as to guide oil from the apertures in the fan thrust shaft 64 to the apertures in the IP shaft 45 oil feed path from an internal cavity of the fan thrust shaft to outside of the outer shaft).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft, the gas turbine engine comprising:
    a rotatable shaft defining a rotational axis, the rotatable shaft extending between a rearward end and a forward end of the gas turbine engine;
    a compressor drum surrounding, and coupled to, the shaft so as to define an annular gap therebetween;
    an intermediate case arranged axially rearward of the compressor drum and comprising a bearing support element extending into the annular gap;
    a rearward bearing mounted between the intermediate case and the shaft;
    a forward bearing that is forward of the rearward bearing, mounted between the bearing support element and the shaft, and proximate a forward end of the compressor drum such that the forward bearing is less than 50% of an axial length of the compressor drum from the forward end of the compressor drum;
    a fan assembly that is forward of the compressor drum, the fan assembly comprising a fan that has fan blades and is located forward of the compressor drum; and a gearbox arranged to receive an input from the rotatable shaft and output drive to the fan so as to drive the fan at a lower rotational speed than the rotatable shaft; wherein the rotatable shaft is a hollow shaft defining an elongate cavity, and a fan thrust shaft is located within the cavity of the rotatable shaft and is coaxial with the rotatable shaft, the fan thrust shaft being connected to the fan of the gas turbine engine.

2. The gas turbine engine of claim 1, wherein the rearward bearing is proximate a rearward end of the compressor drum.

3. The gas turbine engine of claim 1, wherein the compressor drum comprises a plurality of axially arranged compressor discs.

4. The gas turbine engine of claim 3, wherein the forward bearing is located axially between the forwardmost and second most forward compressor disc.

5. The gas turbine engine of claim 3, wherein the rearward bearing is substantially axially aligned with the rearmost compressor disc.

6. The gas turbine engine of claim 1, wherein one of the rearward bearing and the forward bearing is a roller bearing and the other of the rearward bearing and the forward bearing is a ball bearing.

7. The gas turbine engine of claim 1, wherein the forward bearing is a roller bearing.

8. The gas turbine engine of claim 1, wherein the rearward bearing is a ball bearing.

9. The gas turbine engine of claim 1, wherein the shaft comprises a drive arm coupling the shaft to the compressor drum.

10. The gas turbine engine of claim 9, wherein the forward bearing is mounted between a rearward end of the drive arm and the bearing support element.

11. The gas turbine engine of claim 9, wherein the compressor drum comprises a plurality of axially arranged compressor discs and the drive arm is coupled to the forwardmost compressor disc.

12. The gas turbine engine of claim 11, wherein the compressor drum comprises a connector portion extending from the forwardmost disc to the drive arm.

13. The gas turbine engine of claim 1, wherein the bearing support element comprises a frustoconical skirt extending from a body of the intermediate case.

14. The gas turbine engine of claim 1, wherein the compressor drum is an intermediate-compressor drum of the gas turbine engine and the rotatable shaft is an intermediate-pressure shaft of the gas turbine engine.

* * * * *